UNITED STATES PATENT OFFICE.

JOSEPH MORRIS CLARKE, OF SHREVEPORT, LOUISIANA.

PROCESS OF MAKING LEAVENED BREAD FROM WHEAT-FLOUR AND CORNMEAL.

1,272,220.      Specification of Letters Patent.      Patented July 9, 1918.

No Drawing.      Application filed September 22, 1917. Serial No. 192,715.

*To all whom it may concern:*

Be it known that I, JOSEPH MORRIS CLARKE, a citizen of the United States, residing at Shreveport, in the parish of Caddo and State of Louisiana, have invented certain new and useful Improvements in Processes of Making Leavened Bread from Wheat-Flour and Cornmeal; and I do hereby declare the following to be a full, clear, and exact description of the invention, such as will enable others skilled in the art to which it appertains to make and use the same.

My present invention relates to improvements in the manufacture of leavened bread from a mixture containing wheat flour and corn meal, or corn flour.

It is well known that wheat flour contains quite a large proportion of gluten, sugars and other yeast food which, acted upon by the yeast, cause fermentation, with corresponding productions of carbonic acid gas, with the result that wheat flour dough to which yeast may have been added leavens or becomes light and spongy or "rises".

It is also well known that there is very little, if any, gluten in corn meal, and yeast has not the same effect upon corn meal as it has upon wheat flour; and the object of my invention is to manufacture a leavened bread composed of a mixture of wheat flour, and corn meal, which will be highly palatable, and has all the appearances of wheat bread, and without the strong taste that is commonly recognized in the use of corn meal in making bread.

According to my invention I first add water in sufficient proportions to the corn meal to make a thin mash, and I then steam this mash so as to cook the corn meal and form a mush. This mush is allowed to cool somewhat, and then to every 200 pounds of corn meal incorporated in the mush I add approximately 4 ounces of pure grape cream of tartar, and thoroughly incorporate the same in the mush. The effect of this cream of tartar is to keep the mush sweet until the baking period is reached; at the same time it serves to furnish a substance which will assist in the fermentation of the batch, after the wheat flour and other ingredients have been added, as will be hereafter described.

The cream of tartar, which is acid potassium tartrate, has apparently several effects. One of these is its effect upon the starch of the corn flour or corn starch. Certain acids, organic as well as inorganic, have this effect, and tartaric acid is one. The consistency of the starch is modified and it is made apparently more viscous and tenacious. The starch thus modified in this sense behaves like gluten in that it retains the bubbles of carbonic acid gas formed in fermentation, and permits rising to occur while retaining said gas within the mass. Another function of the same material is gustatory in that the cream of tartar in the small quantity added, serves as a corrective to the slightly oily flavor which corn products are apt to have at times; and the third function it performs resides probably in the presence of the potassium constituent, potassium in some form being a useful addition to any pabulum in which the yeast plant is permitted to grow. No one salt seems to embody the foregoing three advantages so well as cream of tartar, although it is obvious that corresponding salts of citric acid, and perhaps of other acids, might be added, and that the tartaric acid of the present case might be added in some other form.

This mush is then added to the ordinary baker's batch of leavened bread, whether of the ordinary sponge dough or the ordinary straight dough. The proportion of the corn meal mush may be varied from only a small proportion, relative to the weight of flour, up to 50% by weight of corn meal and 50% by weight of wheat flour. The resultant mass will then ferment in the usual way, and when the desired degree of fermentation has been reached the bread is baked in the usual manner.

In order to make the bread from the straight dough, the wheat flour, sugar, salt, and other ingredients commonly used in bakers' bread are mixed in with the mush until the entire mass is thoroughly mixed into the bread dough, and the dough is allowed to stand for the period necessary for fermentation, which can only be determined by climatic conditions, and the knowledge of the same lies within the skill of the baker's art.

Where sponge dough is used, the water is added to the sponge in the usual manner, then this paste of sponge and water is added to the corn meal mush, containing cream of tartar, in which the cream of tartar is substantially in the proportions of 4 ounces of cream of tartar to every 200 pounds of corn meal, then the additional flour and other ingredients used by the baker are added, and the dough is ready for further fermentation; and when the fermentation has reached the desired stage the batch is baked in the usual way.

In either case the proportions of corn meal and wheat flour may be varied from a very small percentage of corn meal to equal parts by weight of corn meal and wheat flour.

I have found from practice that the resultant product is a bread which looks like the ordinary home-made wheat bread; and when the meal from white corn is used has all the appearances of wheat bread, while if darker wheat or darker corn meal is used the bread may be slightly yellowish. The taste of the bread closely resembles that of wheat bread, and is extremely palatable; the bread being also highly nutritious and thoroughly digestible. The crust of the bread is tenderer than the ordinary wheat bread, and the bread will keep longer.

In making the dough from the wheat flour any of the ordinary ingredients incorporated by bakers may be added as desired.

In the foregoing description where I have referred to corn meal as the more common product of the corn, which can be more conveniently secured than corn flour, either corn flour or corn starch may be used as a substitute for the corn meal.

I do not mean to limit myself to any particular proportions of corn meal or wheat flour, or to any particular ingredients that may be incorporated into the batch in the process of making the bread, as these will come within the skill and desire of the baker.

Having thus described my invention what I claim and desire to secure by Letters Patent of the United States is:—

1. The process of making leavened bread from a mixture containing wheat flour and corn meal, which consists in adding water to the corn meal, cooking the product so formed into a mush, then adding to this mush cream of tartar, then adding to this mixture wheat flour containing yeast and other ingredients necessary to the growth of the yeast, thoroughly mixing the same, allowing the same to ferment, and finally baking the same, substantially as described.

2. The process of making leavened bread from a mixture containing wheat flour and corn meal, which consists in adding water to the corn meal, cooking the product so formed into a mush, then adding to this mush cream of tartar, the proportions of cream of tartar being approximately 4 ounces of cream of tartar to 200 pounds of corn meal, adding to this mixture wheat flour containing yeast and other ingredients necessary to the growth of yeast, thoroughly mixing the same, allowing the same to ferment, and finally baking the same, substantially as described.

3. The process of making leavened bread from a mixture containing wheat flour and corn meal, which consists in adding water to the corn meal, cooking the product so formed into a mush, then adding to this mush cream of tartar, the proportions of cream of tartar being approximately 4 ounces of cream of tartar to 200 pounds of corn meal, adding to this mixture wheat flour containing yeast and other ingredients necessary to the growth of yeast, the proportion of wheat flour and corn meal varying between a small per cent. of corn meal relative to the flour and 50% of each, thoroughly mixing the same, allowing the same to ferment, and finally baking the same, substantially as described.

4. The process of making bread which consists in boiling corn flour to make a mush, cooling said mush, adding to said mush a small proportion of an organic acid adapted to have a modifying effect upon the starch of the corn flour, then adding to the mush so treated wheat flour and yeast, permitting fermentation to proceed, and molding and baking in the usual manner.

5. The process of making bread which consists in boiling a mush of corn flour, cooling, adding a small proportion of a salt of an organic acid adapted to have a modifying effect upon the corn flour to have an effect upon the growth of the yeast plant and to have a gustatory effect, adding to said corn flour mush thus treated wheat flour and yeast in proper proportions, fermenting, molding and baking in the usual manner.

In testimony whereof, I affix my signature.

JOSEPH MORRIS CLARKE.